United States Patent
Walter et al.

(10) Patent No.: US 7,628,838 B2
(45) Date of Patent: Dec. 8, 2009

(54) METHOD FOR PRODUCING PARTICLE-SHAPED MATERIAL

(75) Inventors: Rajner Walter, Waging am See (DE); Martin Walcher, Oberndorf (AT)

(73) Assignee: Mepura Metallpulvergesellschaft mbH, Braunau am Inn (AT)

( * ) Notice: Subject to any disclaimer, the term of this patent is extended or adjusted under 35 U.S.C. 154(b) by 482 days.

(21) Appl. No.: 10/504,461

(22) PCT Filed: Feb. 13, 2003

(86) PCT No.: PCT/EP03/01449

§ 371 (c)(1), (2), (4) Date: Jan. 24, 2005

(87) PCT Pub. No.: WO03/068378

PCT Pub. Date: Aug. 21, 2003

(65) Prior Publication Data

US 2005/0115360 A1   Jun. 2, 2005

(30) Foreign Application Priority Data

Feb. 13, 2002   (DE) .................. 102 05 897

(51) Int. Cl.
B22F 9/08 (2006.01)
(52) U.S. Cl. .......................... 75/338; 75/339
(58) Field of Classification Search .................. 75/338, 75/339
See application file for complete search history.

(56) References Cited

U.S. PATENT DOCUMENTS

| 4,218,201 | A * | 8/1980 | Kozima et al. | 425/7 |
| 4,343,433 | A * | 8/1982 | Sickles | 239/3 |
| 6,334,884 | B1 * | 1/2002 | Tornberg | 75/337 |
| 6,565,342 | B1 * | 5/2003 | Chow | 425/6 |
| 6,808,568 | B2 * | 10/2004 | Sekine | 148/302 |

* cited by examiner

*Primary Examiner*—George Wyszomierski
(74) *Attorney, Agent, or Firm*—Bachman & LaPointe, P.C.

(57) ABSTRACT

A method for producing particle shaped material from a melt. The method comprises the following steps: the material is melted, the material melt is intimately mixed with a gas in a predetermined ratio; the gas-liquid mixture is suddenly expanded and the material powder thus produced is collected, which the other gas is added to according to a predetermined air/liquid ratio during the expansion with solidification of the formed material drop, to form a material powder having a controlled size distribution and shape in an area of lower pressure than the gas/liquid mixture.

7 Claims, 6 Drawing Sheets

RING FLOW

BLOW FLOW

METHOD FOR PRODUCING PARTICLE-SHAPED MATERIAL

BACKGROUND OF THE INVENTION

The Invention pertains to a method for controlled production of particle-shaped material from the molten substance.

Production of particle-shaped material from molten substance is known for plastic, natural substances, glasses and even metals. There is a constantly increasing demand for powders of such types of materials having small grain size.

These known methods produce a particle-shaped material which can also be referred to as powder, granulate, smalls or something similar. For the sake of simplicity, these particle-shaped materials are referred to below as powder. These kinds of powders are used for example in injection moulding techniques, production of alloys, sintering techniques, bonding materials, catalysts, paints and lacquers, cellular plastic production etc. The market for these applications has a high demand of powder having small. grain size of certain particle shapes in large quantities at low cost. Till now these types of powders were produced a.o., in that—as described for example in the document WO 01/62987, fluid fused substances like oxidic slag, glasses or fused metal are nozzle jetted or atomised in some other way in a chamber by high pressure gas expansion—for example, with the help of rotating plates/discs which centrifuge away the generated droplets and thus pulverise (Rotating Disc Method), or even by means of Roller Atomisation—whereby molten metal droplets meet an rotating rollers and are centrifuged away from them and get solidified an the flight path. Another typical method is water atomisation. To a large extent however, mainly gas atomisation is used. For this, nozzles, like Laval-nozzles are used, in which the fluid molten substance is first strongly accelerated and thereafter sporadically expanded under strong acceleration to a high velocity at the nozzle exit into a chamber and thus atomised.

A typical method is described in the Austrian patent document 298 7350 of Eckart-Werke. Ideally, the molten substance is further distributed by gas currents simultaneously along with this sporadic expansion at the nozzle outlet and thus finely distributed fused droplets are obtained which get solidified an cooling and thus form the powder. Hence the known generic method consists of bringing a material melt after exit out of the nozzle in contact with gas and simultaneously sporadically expanding it. This known method is disadvantageous to the extent that it was very difficult to control, had to be interrupted very frequently and could not be carried out continuously. Finally, the energy costs were also very high.

From the document WO 99/11407 of Pacific Metals Co. Ltd. it is known that one can obtain metallic powder through atomisation of fused-fluid metal, in that an away current of the fused-fluid metal is atomised at the exit of a nozzle by introducing it into the centre of the nozzle along with a laminar-gas current enveloping it and by introducing a fluid current an an exit of both the currents from a conical nozzle, which strengthen the atomisation. In this case, in addition to the gas current a fluid current should also be provided, which is complicated.

From the document EP-A-1038976 a method is known, in which sprayed molten droplets in the inner region of a spray jet are heated up once again in the inner region of a cooled cooling chamber by means of post-combustion of hot gases after exit from the spray nozzle and thus a better distribution of the molten droplets is achieved by means of the heated combusting gases and hence the fineness of the produced powder is improved. This method is very energy intensive, as it requires cooling of the walls of the cooling chamber and also cumbersome measures will have to be carried out for producing small particle sizes.

A disadvantage of the known method is also, that these did not try to control the particle size or shape; a uniform particle size spectrum was generated by setting the gas/fluid-ratio, on which no other influence could be exercised.

It is therefore the task of this invention to create a continuous, efficient method for controlled production of powders from material melts, which would allow control of size and shape of the produced particles.

SUMMARY OF THE INVENTION

This task is fulfilled by the invention with the help of a method for producing particle-shaped material from molten substance with melting of the material, inner mixing of the molten material with a gas in a pre-defined ratio; sporadic expanding of the gas/liquid mixture; and collection of the thus produced material powder, in which addition of further gas in a pre-defined air/liquid ratio during the expansion under solidification of the formed material droplets to the material powder in a controlled size distribution and shape into a chamber having lower pressure than the gas/liquid mixture.

It was surprisingly found out that with the help of the double setting of the gas/melt ratio as per the invention, in the first mixing step within the melt and with the sporadic expansion at the nozzle exit, the particle size spectrum is controllable with respect to the average particle size as well as with respect to the total particle size distribution spectrum, whereby with the consumption of the same amount of gas smaller particles can be attained than in the case of methods which feed gas only once.

In the first mixing step, an addition of more gas to the melt, the average particle size gets reduced.

The ratio of the mass flows of both phases $GLR = m_{gas} = mli_q$ (Gas/Liquid-Ratio) is determined by the following factors:

1) The inlet cross sections into the mixing chamber $A_{gas}$ or $A_{Liq}$

2) The preliminary pressures $P_{0.gas}$ or $P_{0.liq}$ at the inlet.

Figure 4:
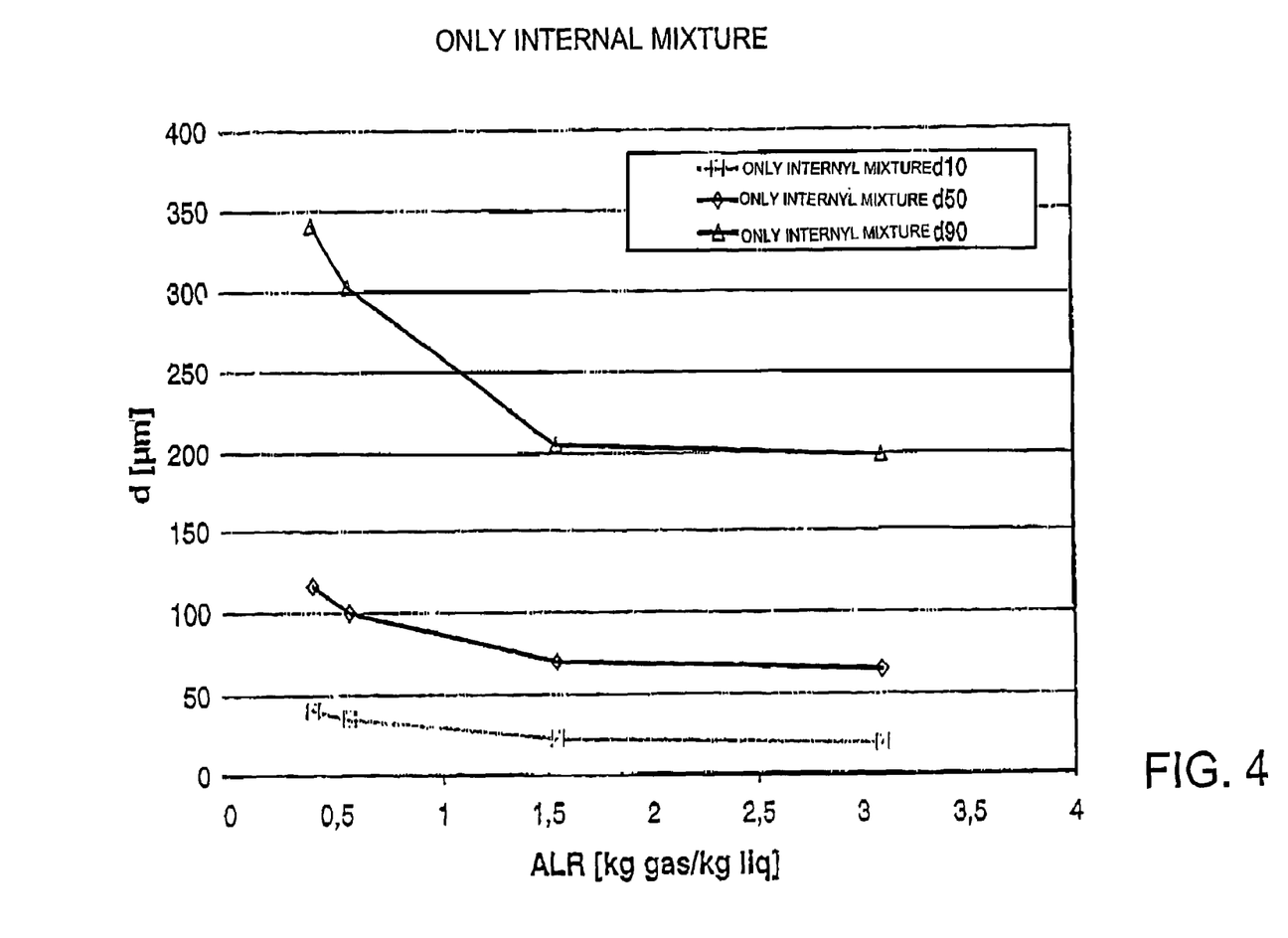
FIG. 4 the result of nozzle jetting of aluminium/air mixture without additional feeding of the air at the nozzle exit.

According to the Invention, both these factors can be regulated as desired, in order to ensure a constant ratio GRL during nozzle jetting. The influence of the GLR an the powder fineness is shown in FIG. 4. From that one can see that by regulating the inlet cross sections $A_{gas}$ or $A_{liq}$ or with the help of the available preliminary pressures $B_{0.gas}$ or $B_{0.liq}$, both of which conform to the mass ratio of both components, the particle fineness can be controlled.

Figure 6:
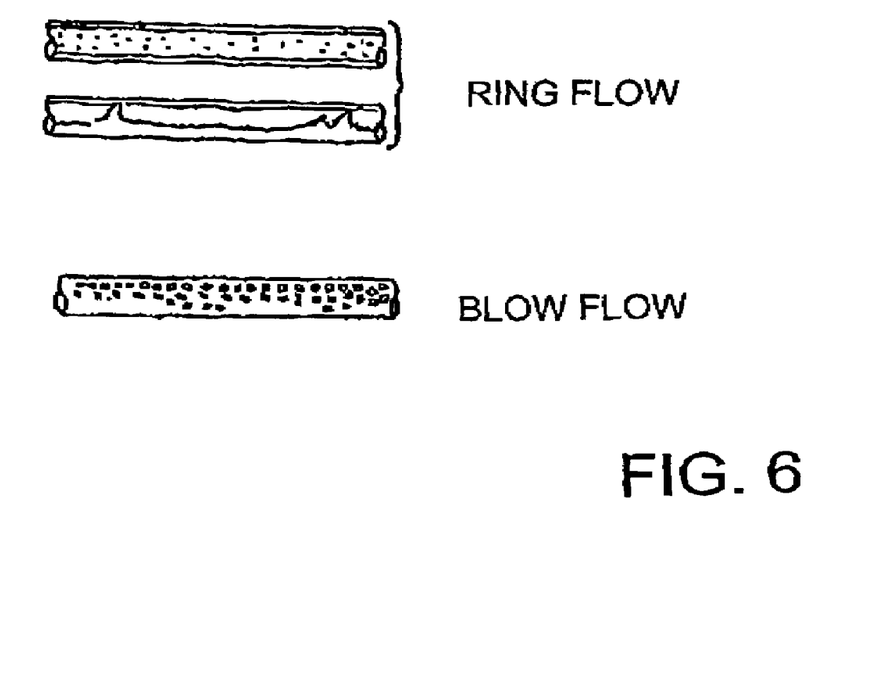
FIG. 6 schematic representation of flow profiles.
Figure 7:
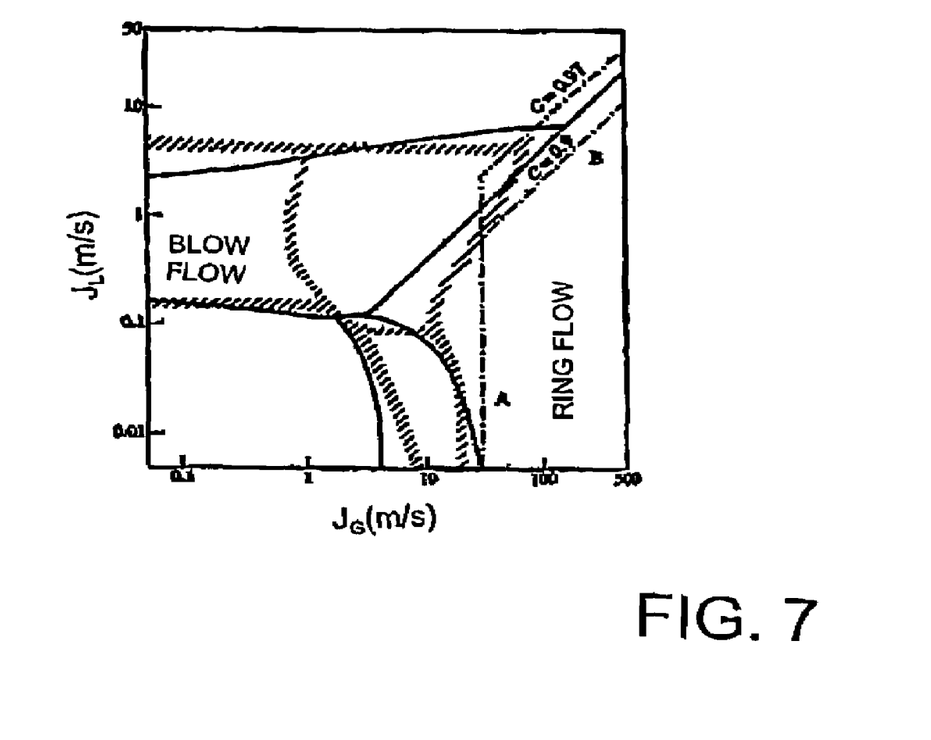
FIG. 7 flow pattern as a relation of the empty pipe velocity of gas and liquid in the mixing chamber.

Addition of further gases at the nozzle exit leads to even finer material. For this, it is important to know the flow ratios in the mixing chamber: depending an the empty pipe velocity J of the fluid and gaseous phase (VLR.$1 = M_{l/A}$), different flow regimes could get formed (FIG. 6); in the method as per the invention one works with blow flow or ring-(spray-) flow. The empty pipe velocity for gas $J_G$ and liquid $J_L$ can be obtained by the experts from the diagram shown in FIG. 7.

Blow Flow

While working in the region of blow flow in the mixing chamber the gas phase does not form any bubbles which expand an account of drop in pressure and then burst at the point of maximum pressure drop (in the region of drop exit). The continuous liquid phase is thereby divided into ligaments which disintegrate into droplets in a second step. The critical parameter for this secondary droplet disintegration is the relative WEBER-NUMBER We$_{rel}$(see Wallis, G., B: (1969)—One-Dimensional Two-Phase Flow: New York: Mcgraw-Hill)

$$We_{rel} = (\rho_{gas} \cdot d_{drop} \cdot v^2 rel)/\sigma$$

For V$_{rel}$=V$_{gas}$-V$_{liq}$ relative velocity between gas and liquid (m/sec)
D$_{drop}$=diameter of the liquid drop (m) ($\rho_{gas}$=density of the gas. (kg/m$^3$)
$\sigma$=surface tension of the melt (N/m)
For secondary drop disintegration We$_{rel}$<12-13 holds good In order to achieve secondary drop disintegration with a water drop size of say d$_{drop}$=50 μm at the nozzle exit, a relative velocity would be required between the drop and the surrounding gas of around 125 m/s, which however can never be attained an account of the limiting twophase sound velocity. Now by bringing up an outer mixing one surprisingly gets the required velocity, in order to atomise the ligaments and drops present at the nozzle exit in an energyefficient manner. In this way, with the gas velocity of the outer mixing, the particle diameter of the powder can be controlled. The above mentioned relation between the dimensionless Weber number holds good for all liquids (even metals). This means that with the help of this method one can also process Cu, Al, Zn, Sn etc. to powder.

In the following tables the critical velocities are given, which are necessary for a secondary atomisation for a 50 μm drop of various metals:

|  | Surface tension a (N/m) | Critical velocity v (m/s) |
|---|---|---|
| Water | 0.07 | 125 |
| Copper | 1.16 | 500 |
| Tin | 0.68 | 380 |
| Aluminium (99%) | 0.18 | 196 |
| Lead | 0.43 | 303 |
| Iron | 1.8 | 620 |
| Silver | 0.91 | 440 |

In case of atomisation of metals and other materials the following should further be taken into account: the time required for secondary drop atomisation is often longer for materials than the time which the drop takes for solidification. Also because of this, one cannot achieve such a good result in the drop (=powder) fineness with a purely internal mixing.

Ring Flow

With increasing gas flows in the mixing chamber the bubbles coalesce and a ring-shaped liquid film gets formed along the chamber walls, the gas flows in the core of the chamber and rips with increasing velocity (for example, in case of pressure drops) droplets out of the liquid film.

Figure 8:
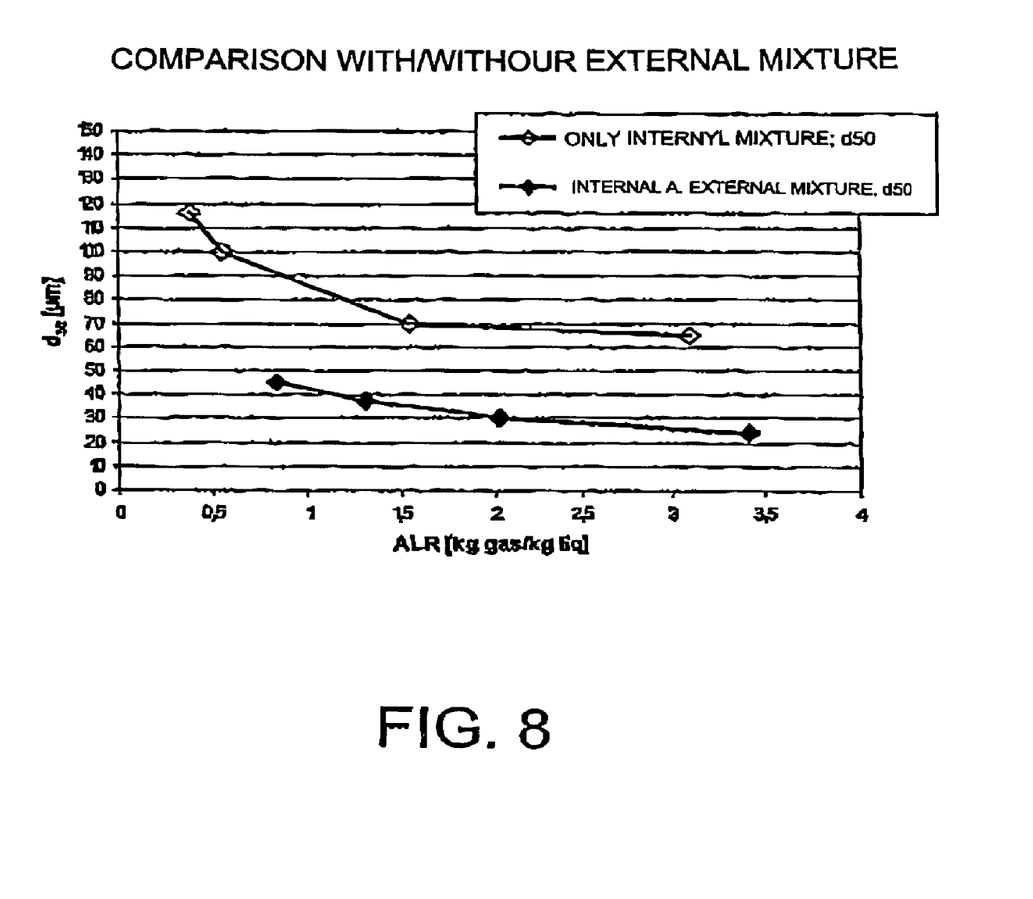
FIG. 8 comparison of nozzle jetting of aluminium with air with and without feeding of air at the nozzle exit—with the absolute quantity of air fed being the same.

The liquid film present at the nozzle exit (the disintegration mechanism described for blow flow also occurs analogously in case of ring flow) are again subjected here to a secondary air fed from outside, which yields the required good atomising result, as one can see in FIG. 8.

The particle shape can also be similarly controlled by the method as per the invention; thus round particles are obtained for inert gas, whereas oblong particles occur particularly in case of hot gas (air). The particle shape can be of extreme importance for the application of the produced powder and is therefore a significant parameter.

Due to the fact that initially a defined inner melt/gas mixing is produced and this is then expanded alter producing this mixture by sporadically adding further gas, one surprisingly obtains a better crushing of the material droplets, a control of the particle shape as well as an adjustable particle size spectrum. It has also been surprisingly seen that the energy consumption of this method can be significantly reduced as compared to known gas atomisation methods which have to use significantly more gas at significantly higher pressure.

The inner mixture of melt/gas from an atomising unit with a velocity increase of the liquid droplets expands to 30-100 times the conveying velocity from the melting container into a receiving container. The gas particles get accelerated even more strongly an account of their low mass and account for expansion of the exiting jet resulting in improved atomisation. For improving the atomisation, the expansion can be carried out by nozzle jetting the inner material mixture into a chamber having lower pressure. The chamber can also be cooled in order to accelerate the cooling.

For fused metals it could be particularly advantageous to set the inner material of the gas mixture to a ratio gas flow/molten material of 0.05-15, preferably 0.05-3 and more ideally 0.3-1.5 kg-/kg of molten material.

As material, for example, meltable plastic offers itself—plastic granulates are required for injection moulding machines etc. Furthermore, nozzle jettable material say from recycling material can be considered and the thus produced granulates can be further used in a very simple manner—e.g. as additive for cement or similar items. Other suitable materials are metals like Zn, Ni, Al, Ag, Ng, Si, Ca, Cu, —Ni, Mo, Pb, Ti, Sn, Li, Be, W, Fe, Co, Cr, Mn, Be and especially their alloys. Metals in powder form are desired for the most varied for applications, e.g. for metal casting, like injection moulding, for Bonding materials, catalysts, paints, colours.

For all these applications it is apparent that also the particle shape plays an important role; thus round particles have a different shower behaviour and angular friction and are better suited for complete filling up of moulds without hollow spaces and can more easily be conveyed an account of lower inner friction than oblong, spurting particles which have greater friction against one another, which however is desirable for different application forms, e.g. for producing mouldings or for extrusion moulding.

According to the method as per the invention the most varied melts, like glasses and meltable ceramics, metals can be nozzle jetted. However, even meltable natural substances like grease or wax which are solid at surrounding temperature can be processed.

As gases one can use gases known as suitable to the expert for the material to be nozzle-jetted in case oxidation plays only a subordinate role, the gas could be precious air—one could however also work with inert gas which does not react to a noteworthy extent with the material to be nozzle jetted—e. g. nitrogen or argon. Ideally the gas is selected from the group consisting of inert gases, like inert gas, helium, argon, nitrogen—which also influence the particle shape—or gases partially reacting with the melt like nitrogen, air, carbon dioxide, carbon monoxide, water vapour, combustion gas or even mixtures of the saure, whereby the classification of the gas as inert gas depends an the nature of the material to be nozzle jetted, as is known to the expert. The combustion gases include especially also combustion gases produced in situ. By combustion gas generated in situ one refers to such a gas which is formed in the melt from the combustible components—e.g. by addition of hydrocarbons to the melt which also have oxidation-inducing components—e.g. oxygen-containing components.

Due to combustion the gas volume suddenly increases manifold and the mixture of gas/melt get swirled through.

In a typical application of the method, the melt particles of the inner mixture is accelerated to 5-100 times the velocity during an explosion-pipe expansion at the nozzle exit, whereby they get solidified. A typical particle velocity in the mixture which is conveyed in a pipe to the mixing chamber is 0.1 m/sec. and is then accelerated to 50-100 m/sec. during nozzle-jetting. The gas particles of the mixture get accelerated significantly higher an account of their lower mass, somewhat to the magnitude of 1000-times.

BRIEF DESCRIPTION OF THE DRAWINGS

Further objectives, features and advantages can be obtained from the following description and the claims along with the accompanying drawings. The following are shown:

DETAILED DESCRIPTION

Preferred design versions are described below—this is however not restricted in any way to this application—with the help of this method, similarly other meltable material, other metals e.g. nickel, tin, silicon, titanium, metal alloys like bronze; glass or even glasses, meltable plastics (thermoplastics), natural substances like grease and wax as well as other materials can be pulverised.

Figure 1:
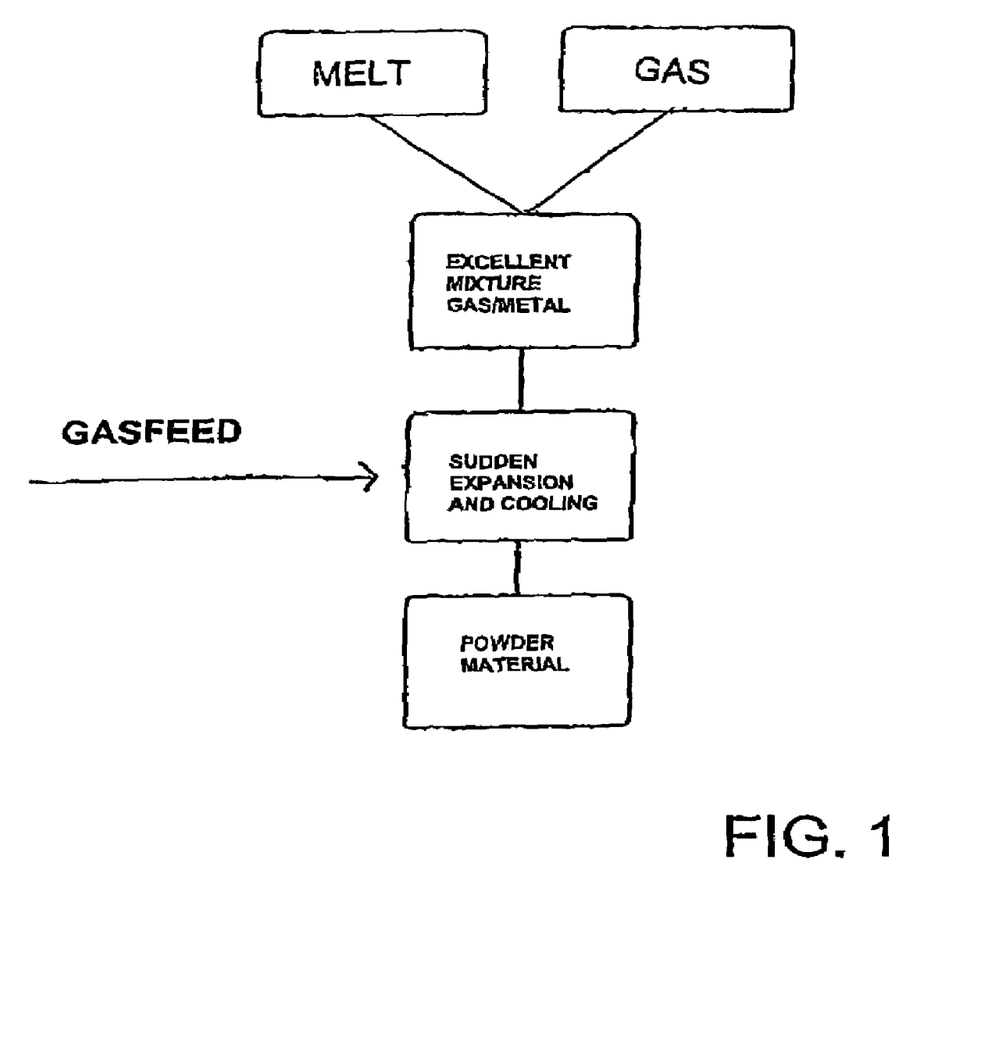
FIG. 1 A schematic representation of the steps of the method.

In FIG. 1 the process sequence according to the principle of the invention is schematically depicted. As shown, the method includes the production of a melt by melting at increased temperature; mixing of the melt (in case of metals) in a ratio of gas/metal of approx. 0.05-15 kg/kg. The mixing should be internal as far as possible, so that the gas is uniformly mixed in larger quantity below the melt. After the mixing step the thus produced gas/liquid mixture is sporadically expanded by a nozzle and sent into a region having lower pressure, whereby the material droplets get solidified and become particles with particle size of <1000 µm, which get solidified during flight and collect in the collecting container. Simultaneously with the sporadic expansion, gas is once again fed at the nozzle exit, whereby an even stronger expansion of the material droplet current results; these are distributed in a finer manner and a controlled/regulated finer particle size spectrum is produced. This depends to a large extent an the type of material thus atomised and the gas used, as has been described in details above.

Figure 2:
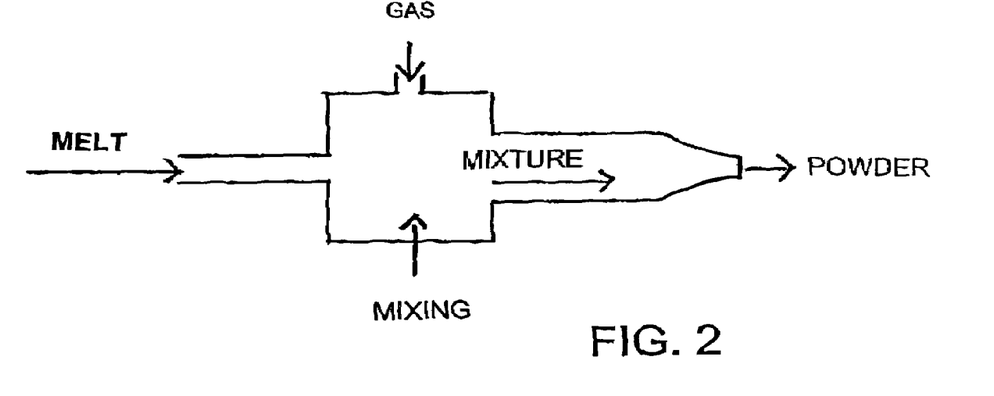
FIG. 2 a perspective part-view of an arrangement as per the invention which can be used for conducting the method.

In FIG. 2 a diagram of a portion of a plant for conducting the method as per invention is shown. These types of plants are known to the expert in all important aspects. A typical plant is, for example, the one described in the document DE-A-2007 803. The known plants are now extended by the invention in such a way that a mixing unit is used for producing the inner gas/material mixture before the nozzle. Such mixing units for gas/melt mixtures are known to the expert and can be selected by him conforming to the melts to be processed, like electromagnetic stirring, finely distributed introduction of gas, like through fritting etc.

A typical ratio of gas/material in the inner mixture should lie—e.g. for aluminium—in the range of 10-60% by weight. On using inert gas one could use lesser gas, in the region of 10-30% by weight; in case of air and gas the ratio lies between 20-60% by weight of gas in the mixture.

By varying the gas content the particle size distribution can be postponed here—the average value of the particle size varies. Furthermore, significantly lesser air needs to be used than in the gas atomisation method according to the state-of-the-art technology. Now it is possible, instead of a gas/metal ratio of 10:1 in the state-of-the-art technology which feeds gas only once, to work with a ratio of 0.5-1.5 kg/kg of gas/metal, which means a significant saving, as only approx. 1/10 of the gas quantity has to be fed in order to obtain comparable average particle sizes; furthermore, the methods according to the state-of-the-art technology do not allow for control/regulation of the particle shape or the particle size spectrum.

Figure 3:
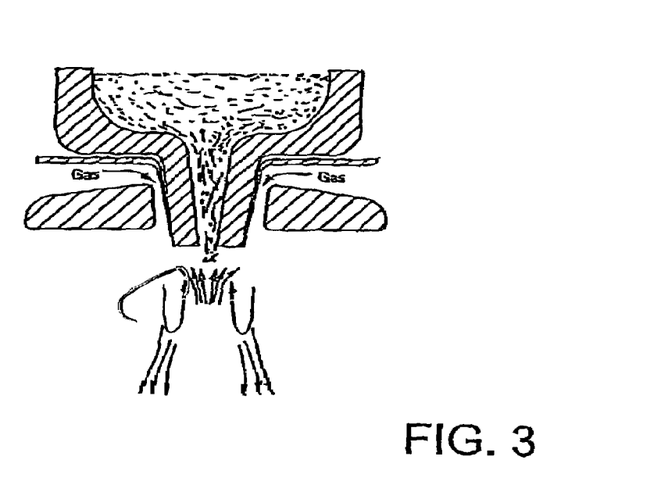
FIG. 3 a sectional view of a nozzle to be used in the method as per the invention.

A typical nozzle used in such types of applications for sporadic expansion is shown in FIG. 3. Here one can clearly identify the introduction of gas in the exit region of the gas/material mixture, which leads to a better guiding of the current of the exiting material and significantly reduces a fixation of the solidified material an the nozzle and reduces the particle size.

One can thus surprisingly see that by using a gas/material melt mixture, the addition of gas while using nozzles with gas entry at the exit of the melt can be significantly reduced for the same yield of material powder and the particle size spectrum as well as the particle shape can be controlled.

Nozzle-Jetting of Zinc.

Zinc is melted at a temperature of approx. 500° C. (melting point: 420° C.). The liquid metal is mixed with air in a mixing chamber in a ratio of 1 Kg air/Kg Zn and then nozzle jetted by a Laval-nozzle connected to the mixing chamber, whereby air is introduced once again at the nozzle exit in a ratio of approx. 0.5 kg/kg. Powder with an average grain size of $d_{50}$=70 µm and a particle size between 3 and 200 µm was obtained. The particles had an oblong,-spurting shape.

Nozzle-Jetting of a Zinc-Copper-Alloy

A zinc-copper alloy is melted at a temperature of approx. 800° C. The liquid metal is mixed with air in a mixing chamber in a ratio of 1 Kg air/kg zinc-copper alloy and then nozzle-jetted through a Laval-nozzle connected to the mixing chamber, whereby air is once again introduced at the nozzle exit in a ratio of approx. 0.5 Kg/Kg. Powder with an average of grain size $d_{50}$: 60 µm and particle size between 3 and 200 µm was obtained. The particles had an oblong,-spurting shape.

Nozzle-Jetting of Copper

Copper is melted at a temperature of approx. 1220° C. The liquid metal is mixed with air in a mixing chamber in a ratio of 2 Kg air/Kg Cu and then nozzle jetted through a Laval-nozzle connected to the mixing chamber, whereby air is once again introduced at the nozzle exit in a ratio of 1.5 Kg/Kg Cu. Powder with an average grain size of $d_{50}$: 76 µm and a particle size between 3 and 200 µm was obtained. The particles were almost round.

Nozzle-Jetting of Aluminium

Aluminium is melted at a temperature of approx. 700° C. The liquid metal is mixed with air in a ratio of 0.4 Kg air/1 Kg Al in a mixing chamber and then nozzle jetted through a Laval-nozzle, whereby during nozzle jetting 0.4 Kg air/Kg Al was added. Powder having an average grain size $d_{50}$: 45 µm was obtained, whereby the grain shape was oblong to round.

On using a ratio of 2 Kg of air/Kg Al an average grain size $d_{50}=28$. µm was obtained.

Figure 5:
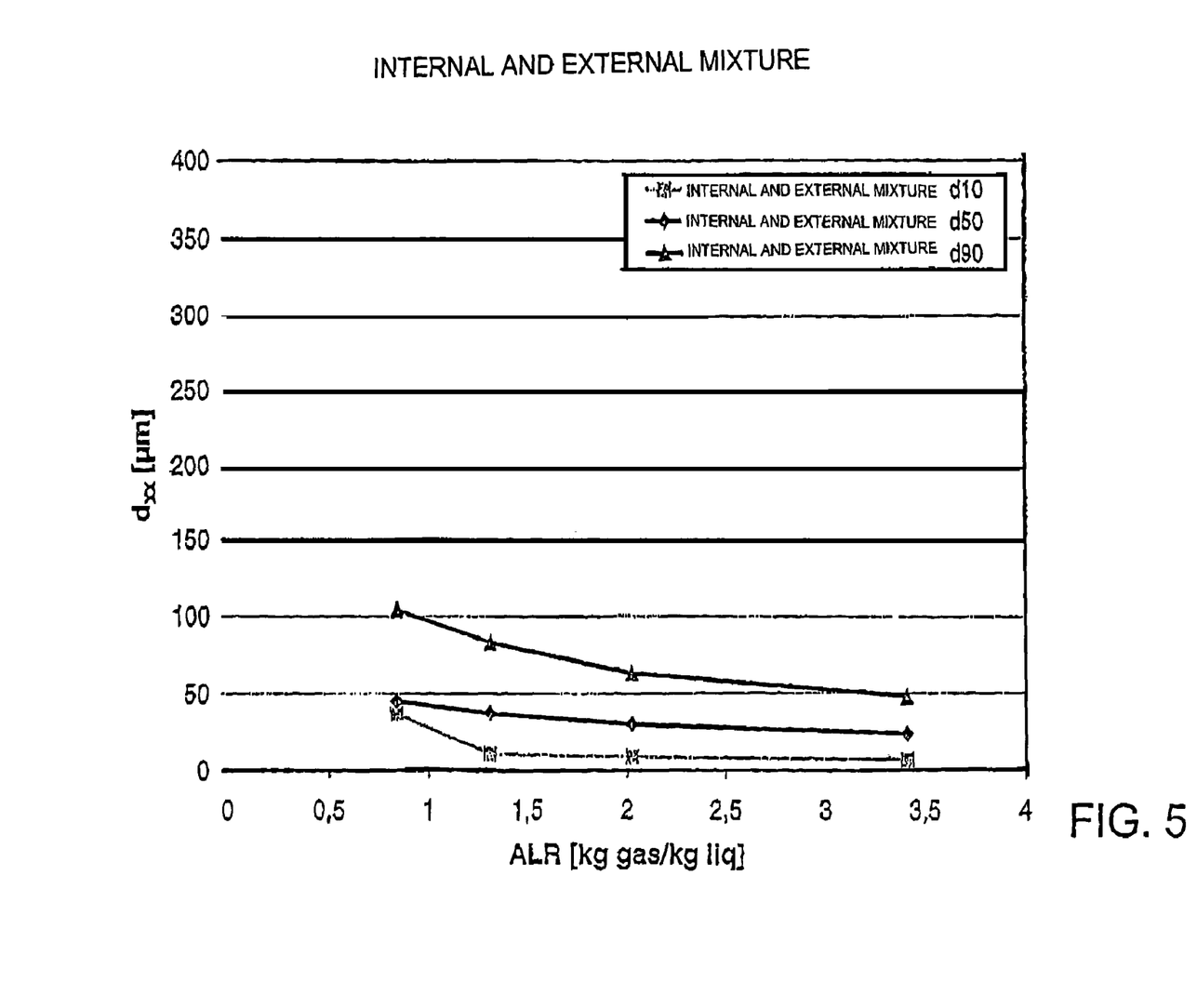
FIG. 5 the result of nozzle jetting of aluminium/air mixture with additional air feeding at the nozzle exit.

Leaving out the addition of gas at the nozzle-exit led to a changed grain size average (see FIG. 4 and 5) for the same quantity of gas/melted metal. One can clearly identify the favourable influence of external air feeding an the grain size in FIG. 5. With increasing air feeding the grain size drops, whereby this influence an application of external air for the same air/metal ratio results in significantly smaller particles. As one can see from FIG. 8, for the same quantity of air fed the addition of air in a mixing chamber and subsequently at the nozzle exit results in significantly smaller particle size than feeding the same air mixture in the mixing chamber alone; here the average particle size gets reduced by half.

Nozzle-Jetting of Magnesium

Magnesium is melted at a temperature of approx. 700° C. under nitrogen atmosphere. The liquid metal is mixed with nitrogen in a ratio of 1 Kg $N_2$/1 Kg Mg in a mixing chamber and then nozzle jetted through a Laval-nozzle, whereby during nozzle jetting 0.5. Kg $N_2$/Kg Mg was added. Powder with an average of $d_{50}$: 70 µm was obtained, whereby the grain shape was oblong to round. On using a ratio of 0.2 kg $N_2$/Mg an average grain size of $d_{50}$ =54. µm was obtained. Leaving out the addition of nitrogen to the mixing chamber resulted in larger particles with $d_{50}$=180 µm for the same gas quantity/Mg. Leaving out the gas addition at the nozzle exit led to a size of $d_{50}$=120 µm. From this one can conclude that only double gas addition delivers the desired effect.

Nozzle-Jetting of Steel

Steel is melted at approx. 1550° C. The liquid metal is mixed with nitrogen in a mixing chamber at a ratio of 1 Kg $N_2$/1 Kg of steel and then nozzle jetted through a Laval-nozzle, whereby during nozzle jetting once again 0.5 Kg $N_2$/Kg of steel was added. Powder with an average of grain size of $d_{50}$:80 µm was obtained, whereby the grain shape was oblong to round. On using a ratio of approx. 2 Kg $N_2$/Kg of steel an average grain size of $d_{50}$=62 µm was obtained. Leaving out the addition of gas to the mixing chamber led to powder with $d_{50}$=221 µm for the same gas quantity/molten metal. Leaving out addition of gas at the nozzle exit led to choking of the nozzle.

Nozzle-Jetting of Slag

Slag from raw iron production is melted at a temperature of 1400° C. The liquid material is mixed with air at a ration of 0.7 Kg of air/Kg of slag and the mixture is then nozzle jetted through a Laval-nozzle, whereby at the nozzle exit once again 0.7 Kg of air/Kg of slag was added. Powder of average grain size of $d_{50}$: 150 µm was obtained.

Obviously this invention is not restricted to the exact design or the listed or described design examples, but various changes are possible without deviating from the core scope and protection scope of the invention.

We claim:

1. A method for producing metal particles from molten metal comprising:

mixing in a chamber molten metal with gas in a predefined ratio to obtain a hot gas/melt mixture having a ratio of gas to melt of 0.5-15 kg/kg, wherein the chamber is provided with an outlet nozzle for the hot gas/melt mixture; and ejecting the hot gas/metal melt mixture by pressure through the outlet nozzle while adding further gas under pressure at the outlet nozzle to the hot gas/melt mixture leading to a particle velocity of 50-100 m/sec to obtain fine liquid droplets which solidify while cooling to form particles of a controlled size distribution and shape, whereas the size distribution is controlled by variation of the gas/melt ratio.

2. The method according to claim 1, wherein the hot gas/melt mixture expands from the outlet nozzle of the mixing chamber with a velocity increase of 10-100 times the original conveying velocity of the hot gas/melt mixture to the outlet nozzle.

3. The method according to claim 2, wherein the expansion is carried out into a chamber having lower temperature than the hot gas/melt mixture.

4. The method according to claim 1, wherein the hot gas/melt mixture has a ratio of gas to melt of 0.5-3 kg/kg.

5. The method according to claim 1, wherein the hot gas/melt mixture has a ratio of gas to melt of 0.5-1.5 kg/kg.

6. The method according to claim 1, wherein the metal is selected from the group consisting of: Zn, Ni, Al, Ag, Mg, Si, Ca, Cu, Mo, Pb, Ti, Sn, Li, Be, W, Fe, Co, Cr, Mn and alloys thereof.

7. The method according to claim 1, wherein the gas is selected from the group consisting of inert gases, helium, argon, nitrogen, air, carbon dioxide, carbon monoxide, water vapor, combustion gas and mixtures thereof.

\* \* \* \* \*

UNITED STATES PATENT AND TRADEMARK OFFICE
CERTIFICATE OF CORRECTION

PATENT NO. : 7,628,838 B2
APPLICATION NO. : 10/504461
DATED : December 8, 2009
INVENTOR(S) : Walter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 967 days.

Signed and Sealed this

Twenty-first Day of December, 2010

David J. Kappos
*Director of the United States Patent and Trademark Office*